United States Patent [19]

Trocciola et al.

[11] 4,001,042
[45] Jan. 4, 1977

[54] SCREEN PRINTING FUEL CELL ELECTROLYTE MATRICES USING POLYETHYLENE OXIDE AS THE INKING VEHICLE

[75] Inventors: John C. Trocciola, Glastonbury; Dan E. Elmore, South Windsor; Ronald J. Stosak, Ellington, all of Conn.

[73] Assignee: United Technologies Corporation, Hartford, Conn.

[22] Filed: Sept. 2, 1975

[21] Appl. No.: 609,860

[52] U.S. Cl. .................................. 427/115; 429/41
[51] Int. Cl.[2] .................... H01M 8/00; H01M 2/14
[58] Field of Search ........... 136/86 R, 146; 427/58, 427/256, 282

[56] References Cited
UNITED STATES PATENTS 3,265,536  8/1966  Miller et al. ................. 136/120 FC
3,575,718  4/1971  Adlhart et al. ..................... 136/146

OTHER PUBLICATIONS

Screen Printing of Microcircuits, Daniel C. Hughes, Jr., p. 62, 1968.

*Primary Examiner*—John H. Mack
*Assistant Examiner*—H. A. Feeley
*Attorney, Agent, or Firm*—Stephen E. Revis

[57] ABSTRACT

A matrix for retaining the electrolyte in a fuel cell is applied to the surface of one or both of the electrodes by screen printing using an inking vehicle which is an aqueous solution of polyethylene oxide. This method produces a very thin, continuous and uniform matrix layer and is well suited to production operations.

4 Claims, 1 Drawing Figure

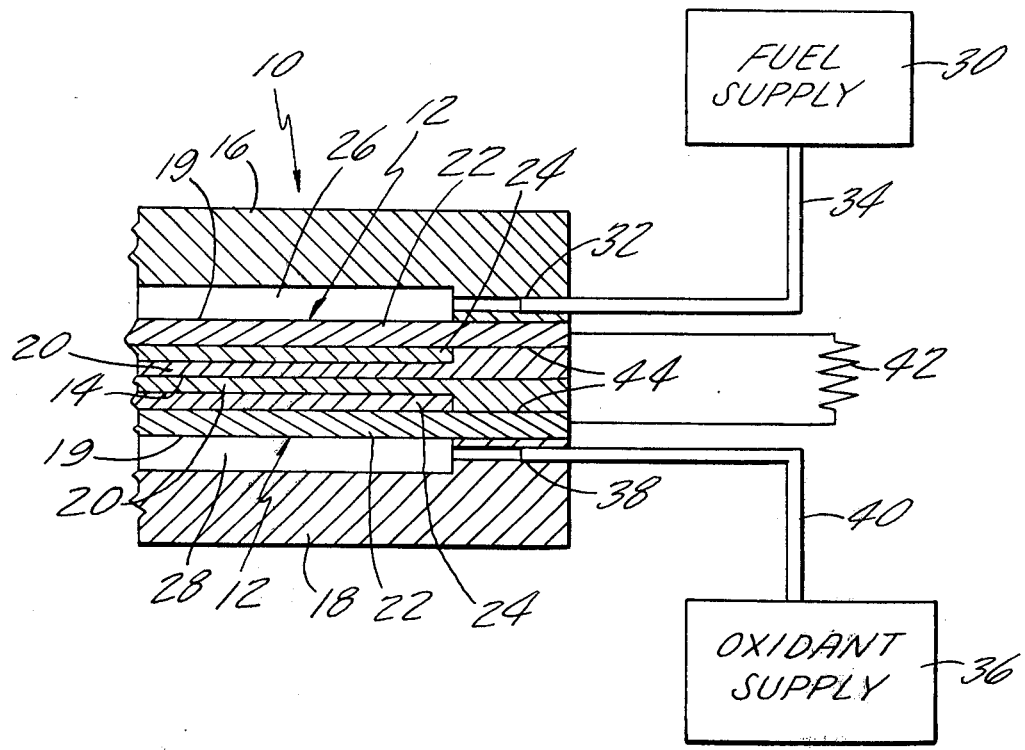

SCREEN PRINTING FUEL CELL ELECTROLYTE MATRICES USING POLYETHYLENE OXIDE AS THE INKING VEHICLE

BACKGROUND OF THE INVENTION

1. Field of the Invention

This invention relates to fuel cells and more particularly to electrolyte retaining matrices and methods for making the same.

2. Description of the Prior Art

Fuel cells for the production of electrical energy from a fuel and oxidant well known in the art. Such cells, in their most simplified design, comprise a housing, an oxidizing electrode spaced apart from a fuel electrode, and an electrolyte disposed between and in contact with said electrodes. The electrolyte can be a solid, a molten paste, a free-flowing liquid, or a liquid trapped in a matrix. This application is concerned with the latter type of matrix which is preferred for many applications.

For optimum performance in a fuel cell employing a trapped aqueous electrolyte, the matrix must exhibit certain properties. For example, the matrix must be hydrophilic. Also, it must be continuous to prevent gas crossover or mixing of reactant gases in the fuel cell; in other words, it should be entirely free from pin holes and cracks. It should be as thin as possible in order that the internal resistance losses through the electrolyte will be minimal. Intimate contact between the matrix and electrode surface is necessary to maximize catalyst utilization. Uniform thickness is also critical to good performance in that lack of uniformity can cause current maldistributions with a loss in performance. It is also desirable that the pore size distribution of the matrix be very well controlled so as to prevent gas crossover and to insure proper electrolyte distribution throughout the cell.

Compounding the problems of achieving the foregoing properties is the fact that one is limited in the choice of materials which can be used. For example, the materials must be chemically and thermally stable at cell operation temperatures; also, they must not poison the catalyst and they must have high electronic resistance. Finally, the matrix should be made by an economical process.

A common prior art economical method for making matrices has been by paper making techniques, wherein the matrix is formed into a sheet and sandwiched between the electrodes in a fuel cell or fuel cell stack by mechanical means. For example, Landi U.S. Pat. No. 3,407,249 forms sheets of fibrillated polytetrafluoroethylene. Mesite et al. U.S. Pat. No. 3,627,859 forms a matrix sheet from cellulosic fibers in combination with a fluorocarbon polymer. Emanuelson et al. U.S. Pat. No. 3,694,310 forms mats of matrix material from phenolic resin fibers coated with a phenolic beater addition resin.

Regardless of the material from which the mat is made, the mechanical sandwiching of a sheet type matrix between electrodes is deficient in that it does not necessarily result in intimate contact between the matrix and the electrode over the entire surface of the matrix. A further problem with making matrices by paper making techniques is that the desired thinness cannot be achieved without losing the property which prevents gas crossover. Even if the matrix sheet could be made as thin as desirable, it would be extremely difficult, if not impossible, to handle.

Another method for forming a matrix, which overcomes some of the problems with the paper making techniques, is to form the matrix directly on the surface of the electrode such as by dipping the electrode into an aqueous solution of the matrix material as described in Blanc et al. U.S. Pat. No. 3,022,244. This has also been accomplished by spraying or painting the matrix onto the surface of the electrode. While these techniques overcome some of the handling problems associated with separate matrix sheets, it is difficult to maintain a uniform thickness. Because of the non-uniformity of the thickness it may be necessary that some areas be thicker than desirable in order to assure that there are no bare spots in the thinnest areas.

Despite the fact that those skilled in the art know what properties and characteristics are necessary for a high performance, fuel cell matrix, it is apparent from the foregoing that a fully satisfactory method for producing such a matrix in an economical manner has not been discovered.

A well-known technique for applying thin layers of various materials onto a variety of substrates is the screen printing or silk screening process. Lee et al. Pat. No. 2,779,975 discusses the use of screen printing for manufacturing electrical components such as capacitors, inductors, resistors, printed circuits, and the like, each of which is composed of built-up layers arranged in a desired pattern, the layers being electrically connected to one another. Screen printing is also, of course, well known for applying decorative patterns onto surfaces such as described in Thompson U.S. Pat. No. 3,577,915.

Despite the diversified uses known in the art for screen printing, there is no teaching or even suggestion that screen printing be used to apply a matrix material to the surface of an electrode. It is Applicants' belief that this is because persons skilled in the art did not believe screen printing could do a satisfactory job. This is discussed further in the Summary of the Invention.

SUMMARY OF THE INVENTION

One object of the present invention is an economical method for forming a fuel cell electrolyte matrix.

A further object of the present invention is a method for making a fuel cell electrolyte matrix which out performs those known in the prior art.

Yet another object of the present invention is a method for bonding a fuel cell electrolyte matrix to the surface of an electrode, the matrix being thinner than prior art matrices while having all the characteristics necessary for good performance.

Accordingly, the present invention is a method for forming a fuel cell electrolyte matrix comprising the step of screen printing the matrix onto the surface of an electrode using an aqueous solution of polyethylene oxide as the inking vehicle.

It has been discovered that by using screen printing techniques, a thinner, more uniform, better performing matrix can be produced as compared to matrices produced by prior art methods.

Initially people skilled in the art of fuel cell manufacture expected that the pattern of the screen might appear on the surface of the matrix after printing thereby resulting in discontinuities or non-uniformity in the thickness of the matrix. Additionally, it was felt that the large particle sizes (on the order of 5 microns in diameter and even larger) in the matrix materials would clog the screen. It was also thought that a screen printed matrix layer would not have all the critical properties necessary for good performance.

Although many of these fears turned out to be false, initial attempts to screen print matrices into fuel cell electrodes were not successful. For example, when water was used as the inking vehicle the matrix material tended to quickly settle out of the mixture, sticking to and clogging the screen thereby preventing a continuous operation and also preventing the attaining of a uniform matrix thickness. Indeed, most of the organic inking vehicles used in known screen printing operations are deleterious to the catalyst used on fuel cell electrodes and would thus be unacceptable for use in screen printing a fuel cell matrix onto the surface of an electrode. Some of the prior art inking vehicles would even burn at room temperature when in contact with a platinum or other noble metal catalyst. Some inking vehicles would cause a decrease in the contact angle between the electrolyte and the wet proofing material within the electrode resulting in a flooded catalyst layer. The prior art fails to teach an inking vehicle suitable for manufacturing good fuel cell matrices.

Despite initial problems continued effort eventually proved fruitful. As it turned out, the key to successfully screen printing a matrix onto an electrode was in the inking vehicle. It was discovered that by using a mixture of ethylene glycol and water as the inking vehicle a very thin matrix having uniform thickness and all the other required properties could be formed. Although glycol, even in small amounts, could not be tolerated in the finished matrix due to the fact that it poisons the catalyst, this did not present a problem since it was possible to completely remove the glycol and water during a heat treatment operation. Matrices made by screen printing and using glycol and water as the inking vehicle are described in a co-pending U.S. application titled "Screen Printing Fuel Cell Electrolyte Matrices" by John C. Trocciola and Dan E. Elmore U.S. Ser. No. 609,866, filed on even date herewith and of common assignee with the present invention.

Although the glycol and water inking vehicle was the first inking vehicle to permit the successful use of screen printing techniques for forming electrolyte matrices, there are some undesirable aspects attributable directly to that particular inking vehicle. For example, it is desirable to produce these matrices in a continuous type of operation, wherein one matrix after another is printed on the same machine as rapidly as possible; however, the matrix material tends to settle out of the glycol and water inking vehicle rather quickly such that matrices printed subsequent to the first printed matrix do not have as uniform a composition as the first printed matrix. A related problem is that as the matrix material settles out of the inking vehicle it sticks to the screen, clogging the interstices thereof requiring the removal and washing of the screen after one or two matrices are printed. A further disadvantage of glycol and water is that it must be removed from the matrix after printing, thereby requiring a number of heating and drying steps which increase the time it takes to produce a finished part.

In view of the foregoing, efforts were continued to find an even better inking vehicle. An aqueous solution of polyethylene oxide unexpectedly turned out to be that better inking vehicle. One of the major advantages of polyethylene oxide is that the matrix material remains well dispersed in the ink over a period of time. The screen does not become clogged with matrix material over a period of time, thereby permitting printing of one matrix after another with virtually no limit and without having to wash the screen. It was also discovered that polyethylene oxide does not poison the catalyst. This enables the elimination of several drying and heating steps. Thus, although most of the polyethylene oxide is volitilized during sintering of the printed matrix, any not removed is harmless to the operation of the fuel cell.

By the method of this invention 2–7 mil thick completely continuous layers of matrix material having variations in thickness of only about 1.0 mil were applied to the surfaces of electrodes. In comparison, the minimum average thickness of a matrix made by paper making techniques of the prior art is only about 8 mils, with variations in thickness on the order of 2 mils. Sprayed or painted on matrices can be made as thin as about 5 mils (average), but have a thickness variation of about 2 mils. It was demonstrated that fuel cells using matrices applied by the method of this invention perform significantly better than fuel cells using matrices made by prior art methods.

The foregoing and other objects, features, and advantages of the present invention will become more apparent in the light of the following detailed description of preferred embodiments thereof as illustrated in the accompanying drawing.

BRIEF DESCRIPTION OF THE DRAWING

The sole FIGURE is a cross-section of a fuel cell, greatly enlarged to show detail, and not to scale.

DESCRIPTION OF THE PREFERRED EMBODIMENTS

The FIGURE shows a fuel cell in cross section designated generally by the numeral 10. The cell 10 comprises a pair of electrode/matrix elements 12 in abutting relationship along the surface 14 and confined between a pair of gas separator plates 16, 18. Each electrode/matrix element 12 comprises an electrode 19 and an electrolyte retaining matrix 20. The electrode 19 includes a substrate 22 having a catalytic layer 24 disposed on the surface thereof. The matrix 20 is screen printed onto the electrode 19 over the catalyst layer 24 in accordance with the present invention.

In this embodiment the plate 16 defines a fuel gas reactant chamber 26 on the nonelectrolyte facing side of the electrode 19; and the plate 18 defines an oxidant reactant gas chamber 28 on the nonelectolyte facing side of the other electrode 19. Fuel, such as hydrogen, from a fuel supply 30 is delivered to the inlet 32 of the chamber 26 via a conduit 34. An oxidant, such as air, from an oxidant supply 36 is delivered to the inlet 38 of the chamber 28 via a conduit 40. The electrodes 19 are shown connected across a load 42.

In this embodiment the substrates 22 are carbon paper impregnated with a wetproofing agent such as polytetrafluoroethylene. Each catalyst layer 24 is a mixture of a catalyst and a fluoropolymer. This layer 24 is applied to the carbon paper substrate 22 by any of the known techniques, such as by spraying or the filtration transfer technique, for example. The catalyst layer 24 terminates short of the edge of the substrate 22 thereby leaving a catalyst free surface area 44 around the edge of each substrate. The matrix layer 20 completely covers the catalyst layer 24 and extends to the edge of the substrate 22, thereby covering the catalyst free surface area 44. The uncatalyzed edges of the substrate 22 are treated so that they are wettable by the electrolyte within the matrix 20. By this arrangement a wet seal is established around the edge of the cell 10 preventing the escape of reactant gases therefrom. This sealing arrangement is more fully described in U.S. Pat. No. 3,867,206 to Trocciola et al., of common assignee with the present invention.

It should be kept in mind that Applicants' invention is not limited to any particular fuel cell configuration, such as the one hereinabove described. The present invention is concerned only with the process for making a fuel cell electrolyte retaining matrix.

In accordance with the present invention, the matrix is applied to the surface of an electrode by screen printing. The screen printing may be accomplished on a commercially available screen printing machine such as the "Compact 4" model manufactured by Argon Service Ltd., Milano, Italy. The electrode onto which the matrix is to be printed is fastened securely to the table of the screen printing machine. The screen is lowered onto the surface of the elctrode. A matrix printing ink is prepared by mixing a suitable matrix material with a liquid inking vehicle. Next, the screen is covered with the ink. The screen is then loaded by applying a small amount of pressure to the ink such that the ink enters the interstices of the screen. This step assures that the screen is completely covered with the ink mix. Next, a larger pressure is applied to the ink in the screen, such as by passing a flexible blade (i.e., squeegee) over the surface of the screen in a manner well known in the art of screen printing. That deposits ink from the screen onto the surface of the electrode. Steps 4 through 6 may be repeated several times in order to develop a desired matrix thickness. The number of passes of the blade will depend upon the ink viscosity, the thickness of the screen, the size of the openings in the screen, the pressure of the squeegee, and the uniformity of the electrode surface onto which the matrix is being printed. The screen is then lifted and the electrode removed. The electrode is then dried and heat treated to remove most of the inking vehicles and to obtain proper characteristics in the matrix.

EXAMPLE

An aqueous solution of polyethylene oxide was unexpectedly discovered to be a highly satisfactory inking vehicle for use in the foregoing process. In a preferred embodiment, this inking vehicle was used to form a silicon carbide matrix. A matrix material of 96% silicon carbide powder with the balance being a binder of polytetrafluoroethylene was mixed into this inking vehicle in a ratio, by weight, of 60 parts matrix material to 40 parts inking vehicle. The inking vehicle in this embodiment comprised 99 parts water to one part polyethylene oxide, by weight. The silicon carbide was Carborundum Company's "Green 1000 Grit", and the polytetrafluoroethylene was Dupont's TFE 3170, which is polytetrafluoroethylene with a surfactant. The polyethylene oxide was Union Carbide's Polyox WSR-301.

The foregoing ratios determine the viscosity of the ink, and were chosen, for this particular embodiment, because they produced good results. The best ratios for other embodiments will depend upon the substrate, the matrix material, the mesh size of the screen and other variables. These ratios can best be determined by trial and error, and can readily be established by persons having ordinary skill in the art.

The ink of this example was used in the aforementioned process to lay down a matrix layer onto the surface of a gas diffusion electrode having a catalyst loading of 0.5 mg/cm$^2$ of platinum on a carbon substrate. The screen used in the process was made of nylon and had a mesh size of 63XX. After printing the matrix, the electrode/matrix combination was dried in a continuous belt infrared oven at less than the sintering temperature and was then sintered at a temperature of 570° F for 2 minutes causing adhesion of the silicon carbide particles to the binder material. As used herein, sintering is defined as raising the temperature high enough to cause bonding of the matrix particles to the binder.

The matrix layer on this electrode was examined and determined to be free of pin holes and cracks. It had an average thickness of 3 mils with a variation in thickness of no more than 1 mil. Its bubble pressure was 3.0–5.5 psi, and its wickability, which is a measurement of its wettability, was 7.0 inches of 85% $H_3PO_4$ in 16 hours at room temperature. This wettability of the matrix is considerably better than matrices screen printed using a glycol and water inking vehicle. This better wettability is not explainable as yet.

A pair of these electrode/matrix elements were assembled into a cell and evaluated using 102 weight percent $H_3PO_4$ as the electrolyte and $H_2$ and $O_2$ as the reactants as well as RM-1 (reformed natural gas having the following composition: 80% $H_2$, 1.7% CO, and 18.3% $CO_2$) and air as the reactant. The cell iR was 16 mv/100 ASF (amps per square foot) and performance is shown in the following table:

|           | 100 | 200 | 300 asf |
|-----------|-----|-----|---------|
| $H_2$, $O_2$ | 765 | 715 | 678     |
| RM-1, air | 700 | 642 | 594     |

A cell having a matrix made according to the present invention has been run for up to 15,000 hours without significant matrix deterioration. It is expected that this type of matrix structure is capable of a minimum of 40,000 hours life.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of our invention, that which we claim as new and desire to secure by Letters Patent of the United States is:

1. A process for making a fuel cell electrode/matrix element comprising the steps of:
    screen printing a hydrophilic electrolyte matrix layer onto the surface of a fuel cell gas diffusion electrode, said electrode including a catalyst layer on the surface onto which the matrix layer is printed, said step of printing including forming an ink by mixing an aqueous solution of polyethylene oxide with a matrix material, and printing said ink onto the surface of said electrode through a screen; and
    heat treating the matrix layer so formed to remove most of the aqueous solution of polyethylene oxide.

2. The process according to claim 1 wherein said matrix material includes a binder, and said step of heat treating includes sintering said matrix material.

3. The process according to claim 2 wherein, after said step of heat treating, said matrix layer is continuous and varies in thickness by no more than 1 mil.

4. The process according to claim 3 wherein, after said step of heat treating, said matrix layer is no more than 7.0 mils thick.

* * * * *